Aug. 23, 1966  R. K. MEYER ETAL  3,268,809
APPARATUS FOR TESTING CAPACITORS FOR LEAKAGE CURRENT
AND SIMULTANEOUSLY FOR INDICATING WHETHER RELIABLE
ELECTRICAL CONTACT IS MADE THERETO
Filed May 20, 1964  2 Sheets-Sheet 1
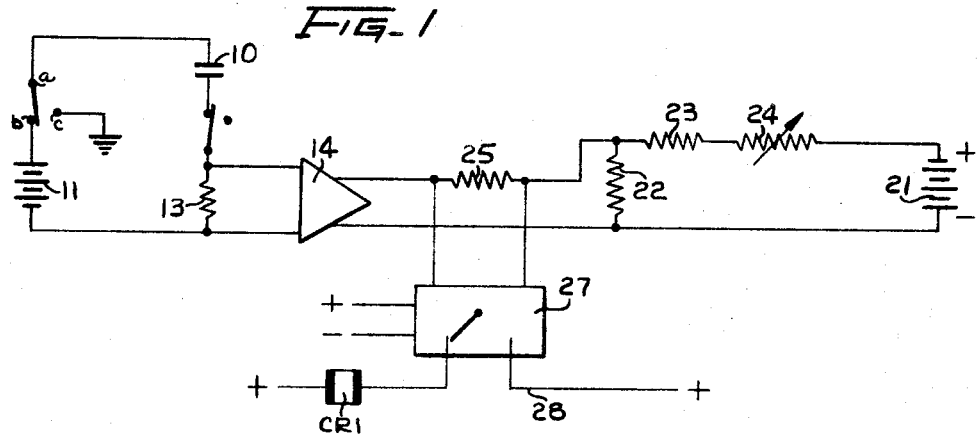
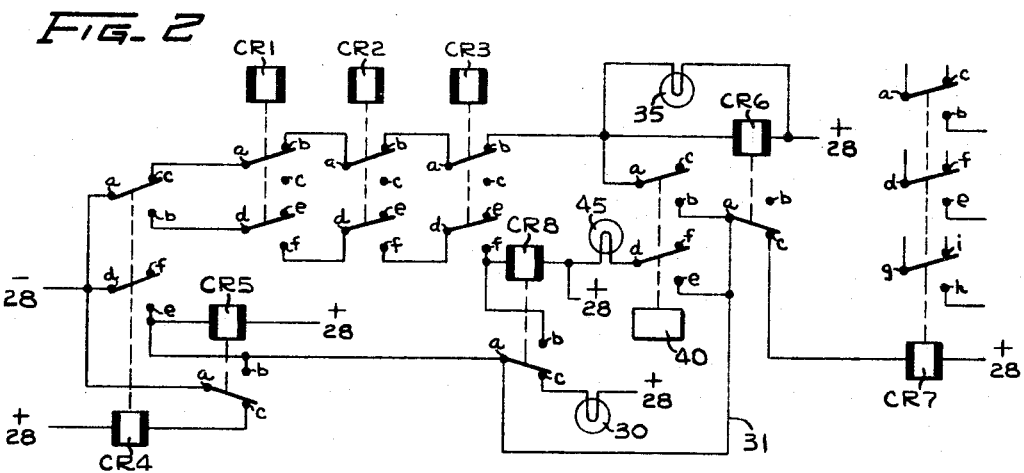
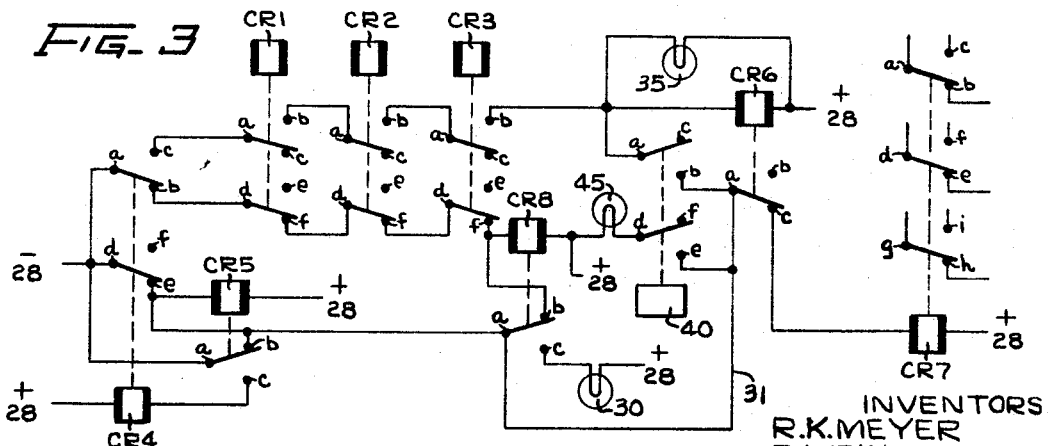
INVENTORS
R.K. MEYER
P. WEINHARDT
BY
ATTORNEY

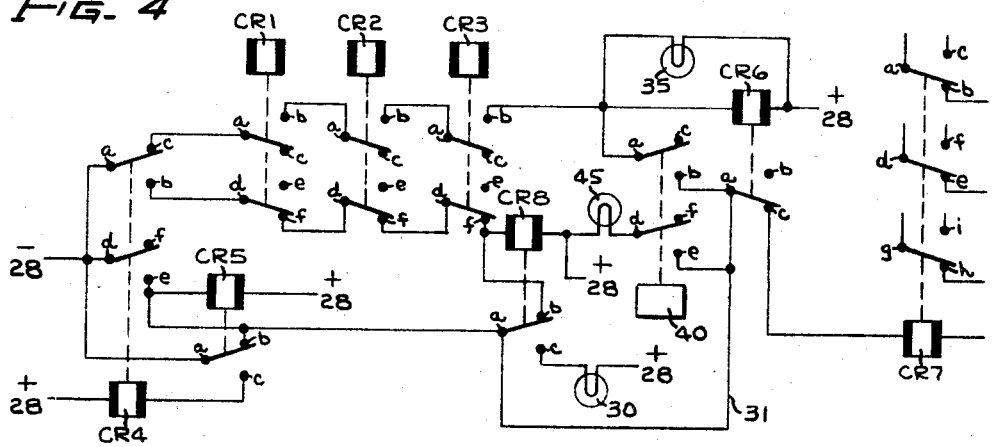
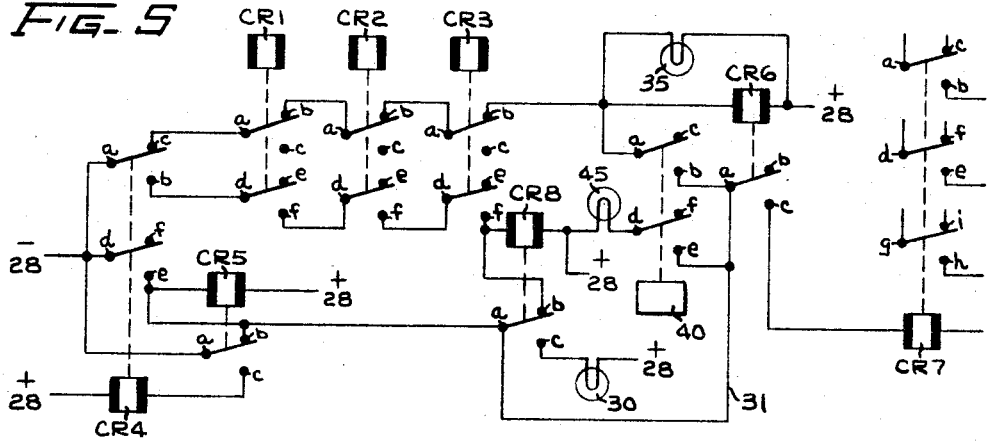
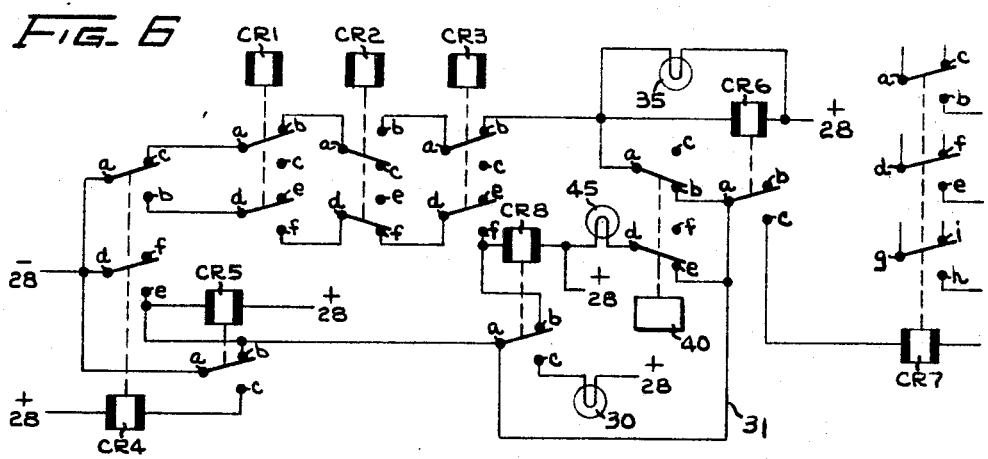

United States Patent Office 3,268,809
Patented August 23, 1966

3,268,809
APPARATUS FOR TESTING CAPACITORS FOR LEAKAGE CURRENT AND SIMULTANEOUSLY FOR INDICATING WHETHER RELIABLE ELECTRICAL CONTACT IS MADE THERETO
Robert K. Meyer and Philipp Weinhardt, Indianapolis, Ind., assignors to Western Electric Company, Incorporated, New York, N.Y., a corporation of New York
Filed May 20, 1964, Ser. No. 368,786
7 Claims. (Cl. 324—60)

This invention relates to capacitor testing apparatus, and more particularly to apparatus for indicating whether capacitor leakage current falls below a prescribed maximum value. It is an object of the invention to provide improved testing apparatus of that character.

It is common practice in the testing of capacitors for leakage current to provide apparatus which gives a positive (i.e. digital) indication as to whether or not the leakage current falls below a prescribed maximum value. A common fault of such testing apparatus is that capacitors are found to be acceptable in the event that there is a failure of contact between the test apparatus and the capacitor, with the result that the capacitor in question is not in fact tested. This fault results from the fact that the testing apparatus is incapable of distinguishing between a small, acceptable leakage current and no current at all.

It is another object of the invention to provide improved apparatus for testing capacitors for leakage current, which apparatus gives a positive indication in the event that there is failure of contact between the test apparatus and a capacitor under test.

It is a further object of the invention to provide test apparatus as defined immediately above, which apparatus gives, upon completion of a test, separate and continuing indications (1) of acceptability of leakage current magnitude and (2) of electrical contact between the test apparatus and the capacitor under test.

Another object of the invention is to provide improved testing apparatus as defined above which is capable of testing a plurality of capacitors simultaneously.

A further object of the invention is to provide testing apparatus having various of the characteristics specified above while being inherently simple in form, and efficient and reliable in operation.

In accordance with one embodiment of the invention, an indicating device is provided for indicating the establishment of electrical contact between the test apparatus and the capacitor or capacitors under test. This indicating device is responsive to the charging current to the capacitor or capacitors, that is, to a current in excess of the prescribed maximum leakage current. A holding circuit is provided to maintain a positive indication of electrical contact between the test circuitry and the capacitor or capacitors under test even after the current ot the capacitors drops below the prescribed maximum leakage value. A separate indicating device is provided for indicating acceptability of the value of leakage current or currents. This indicating device is also responsive to the current to the capacitor or capacitors and provides an acceptance indication when the current to the capacitor falls below the prescribed maximum leakage value. Upon completion of the test, there is a positive and continuing indication of acceptability or non-acceptability of the value of leakage current or currents, and there is a positive and continuing indication as to whether electrical contact was made between the test apparatus and the capacitor or capacitors under test.

This invention, together with further objects and advantages thereof, will best be understood by reference to the following description taken in connection with the accompanying drawings, in which FIG. 1 is a circuit diagram of basic circuitry for producing a digital indication as to whether the instantaneous value of current to a capacitor under test falls above or below a prescribed value;

FIG. 2 is a diagram of circuitry embodying the present invention and responsive to digital indications derived from three circuits such as that shown in FIG. 1. The circuitry of FIG. 2 is shown in the condition assumed immediately after application of power thereto;

FIG. 3 is a diagram similar to that of FIG. 2 but showing the condition of the circuitry during the charging of the capacitors under test and prior to the dropping out of a particular time delay relay employed in the circuitry;

FIG. 4 is a diagram similar to FIGS. 2 and 3 showing the condition of the circuitry during charging of the capacitors and after the above referred to time delay relay has dropped out;

FIG. 5 is a diagram similar to FIGS. 2–4 and showing the condition of the circuitry following the charging of the capacitors and with the currents to the capacitors below the prescribed maximum value of leakage current, and FIG. 6 is a diagram similar to FIGS. 2–5 showing the condition of the circuitry following the charging of the capacitors and with leakage current of one capacitor being in excess of the prescribed maximum value.

As indicated above the basic circuitry of FIG. 1 produces a positive indication that the instantaneous value of current to a capacitor under test falls above or below a prescribed limiting value. In the illustrated form of the basic circuitry, a capacitor 10, under test, has a D.C. voltage applied thereto by a D.C. voltage source 11 through switch contacts *a* and *b*. The current to the capacitor 10 passes through a resistor 13 and the resulting voltage across this resistor is fed to an amplifier 14. The magnified output of the amplifier 14 is bucked against a reference voltage derived from circuitry shown at the right of FIG. 1.

Power is derived from a D.C. source 21, the current flowing through a voltage divider consisting of fixed resistors 22 and 23 and a variable resistor 24. The voltage across the resistor 22 is bucked against the output of the amplifier 14 as shown, the interconnecting circuitry including a resistor 25. As the output of the amplifier 14 varies above and below the voltage across the resistor 22, current flows through the resistor 25 in one direction or the other in accordance therewith.

The voltage thus appearing across the resistor 25 is fed to a relay 27 which assumes one or the other of two conditions dependent upon the polarity of the voltage applied thereto, the relay preferably being responsive to a very small voltage of either polarity. One suitable relay for this application is a control relay designated A–82 manufactured by Daystrom, Inc.

When the relay 27 is in one condition it causes energization or de-energization of a control relay CR1. In accordance with the preferred embodiment of the present invention only the one relay CR1 need be employed in connection with the relay 27 after the testing of one capacitor 10 at one time. Alternatively, however, the relay 27 when in its other condition may operate another relay through energization of a line 28, as well as de-energizing the relay CR1, for example. It is thus seen that relay 27, in conjunction with the voltage comparison circuit, effectively establishes two operable states, one of which effects the energization of relay CR1, the other of which effects the de-energization of that relay.

The basic circuitry of FIG. 1 thus produces a positive, digital indication as to whether the current to the capacitor 10 under test is above or below a prescribed value. In accordance with the preferred form and application of the present invention, the perscribed value is a prescribed maximum value of leakage current of the capacitor under test, and when the leakage value is below the prescribed value the relay 27 causes de-energization of the relay CR1.

It is to be understood that certain portions of the basic circuitry of FIG. 1 must be duplicated for each capacitor 10 which is to be tested at one time. More specifically, for each capacitor under simultaneous test there must be separate positive indication as to whether the instantaneous value of current to the capacitor falls above or below a prescribed value.

In the circuitry of FIG. 2 there is provision for simultaneous testing of three capacitors. The circuitry of FIG. 2 is responsive to the condition of three control relays CR1, CR2 and CR3, the relay CR1 being the same relay CR1 shown in FIG. 1, and the relays CR2 and CR3 being similar relays which are de-energized, in the preferred embodiment, when the currents to corresponding capacitors under test fall below a prescribed value.

Each of the control relays CR1, CR2 and CR3 has six contacts designated a, b, c, d, e and f, the contact a normally engaging contact b but being brought into engagement with the contact c upon de-energization of the corresponding relay, and the contact d normally engaging contact e but being brought into engagement with the contact f upon de-energization of the corresponding relay.

Operation of the test circuit is initiated by the application of D.C. power thereto. In the interest of clarity, power sources are indicated at several different places in FIG. 2. It will be appreciated, however, that in physical form the circuitry requires only two leads.

With power applied to a relay CR4 at the lower left of FIG. 2 through contacts a and c of another relay CR5, the energized relay CR4 closes its contacts a and b and its contacts d and e. Closure of contacts d and e of relay CR4 applies power to the relay CR5 such that it opens its normally closed contacts a and c and closes its contacts a and b. This results in power being removed from relay CR4. However, the relay CR4 is a time delay relay, such as Western Electric Company relay Y–253. The characteristic of that relay which is desired here is that the contacts remain in their energized condition for a substantial period of time following de-energization of the operating coil thereof. It will be appreciated that many such time delay relays are commercially available. Accordingly, the contacts a and b and the contacts d and e of the time delay relay CR4 remain closed for a substantial period of time following the opening of the contacts a and c of the relay CR5.

During the time delay period in which contacts d and e of relay CR4 are closed, power is applied to a lamp 30, this lamp serving to indicate when extinguished, through circuitry described below, that electrical contact has been made between the test circuitry and each of the three capacitors under test. In view of this the lamp 30 is preferably red in color, such that illumination is suggestive of a fault.

Closure of the contacts d and e of relay CR4 also applies power through conductor 31 and contacts a and c of a relay CR6 to the coil of a relay CR7. Actuation of the relay CR7 closes its contacts a and b, d and e, and g and h. Contacts a, b and c of relay CR7 are the same contacts a, b and c shown in FIG. 1. It will be seen that the closing of contacts a and b applies voltage to the capacitor 10 under test, and that subsequent closure of contacts a and c will discharge the capacitor 10 to ground in order that it may be safe to handle following completion of the test. The contacts d, e and f of the relay CR7 serve a similar function for controlling the application of power to a second capacitor under test, and the contacts g, h and i of the relay CR7 serve the same function with respect to a third capacitor under test.

With power applied to the capacitors under test, the charging current in the capacitor circuits is, of course, larger than the prescribed maximum leakage current, with the result that the relay 27 of each of the three basic circuits causes the normally energized associated relay CR1, CR2 or CR3 to be de-energized. This closes the contacts d and f of each of these three relays which, in conjunction with the still closed contacts a and b of the time delay relay CR4, completes a circuit to a relay CR8. This condition is illustrated in FIG. 3.

Energization of the relay CR8 opens contacts a and c thereof to extinguish the indicating lamp 30, it also closes contacts a and b thereof such that the relay CR8 is locked in through its own contacts.

It will now be seen that extinction of the indicating lamp 30 is indicative of effective electrical contact between the test circuitry and each of the three capacitors under test. Only in the event that there is charging current to each of the capacitors (which requires effective electrical contact) can each of the normally energized relays CR1, CR2 and CR3 be de-energized so as to permit its contacts d and f to close such that the relay CR8 can extinguish the indicator lamp 30. However, once the concurrent charging currents in the three capacitors under test have caused the energization of the relay CR8 and extinction of the indicator lamp 30, a continuing indication of effective electrical contact between the test circuitry and all of the capacitors under test is obtained by the locking in of the relay CR8 through its own contacts such that the indicator lamp 30 remains extinguished throughout the remainder of the test cycle. The condition of the circuitry at this point in the cycle of operation is illustrated in FIG. 3.

As indicated above, the time delay relay CR4 must retain its contacts a and b closed for a substantial period of time following the de-energization of the operating coil thereof through opening of the contacts a and c of the relay CR5. It will now be appreciated that the contacts a and b of the time delay relay CR4 must remain closed until the relay CR7 operates its contacts to apply power to the capacitors under test, the charging current in the capacitors causes the relays 27 of the respective basic circuits to de-energize the respective relays CR1, CR2 and CR3, and the closing of the relays d and f of all three contacts CR1, CR2 and CR3 energizes the relay CR8 to extinguish the indicator lamp 30 and lock itself in actuated condition. Only at this time may the contacts a and b of the time delay relay CR4 open without causing a false indication of ineffective electrical contact between the test circuitry and the capacitors under test.

When the contacts a and c of the time delay relay CR4 close, as indicated in FIG. 4, power is available to the upper contacts of the relay CR1, CR2 and CR3. The circuitry remains in the condition illustrated in FIG. 4 until all of the capacitors under test have been sufficiently charged that the leakage current and any small charging current have a total value less than the prescribed maximum leakage current. At such time as the current to each of the capacitors under test falls below the prescribed maximum value of leakage current the respective relay 27 re-energizes the respective relay CR1, CR2 or CR3 to close the contacts a and b thereof as shown in FIG. 5. When all three of these relays have closed their contacts a and b, a circuit is established in conjunction with the now closed contacts a and c of the time delay relay CR4 to an indicating lamp 35. The illumination of the lamp 35, which is preferably green in color, is, therefore, indicative of the fact that current to each of the three capacitors under test is less than the prescribed maximum value of the leakage current.

Attention is directed to the fact that the indicator lamp 35 will be illuminated during any testing of capacitors provided only that the current to each of the capacitors under test reaches a value which is less than the prescribed maximum leakage current. More specifically, this will occur even in the event that there is not effective contact between the test circuitry and one or more of the capacitors under test. However, in the latter event, the red indicator lamp 30 will also be illuminated since there will have been no charging current to at least one of the capacitors under test, continued illumination of the red lamp 30 being indicative of the fact that at least one of the capacitors was in fact not subjected to test.

Illumination of the green lamp 35 is accompanied by actuation of the relay CR6, briefly referred to above. Actuation of this relay opens its contacts $a$ and $c$ such that power is removed from the relay CR7. Opening of its contacts $a$ and $c$, $d$ and $f$, and $g$ and $i$ interrupts the application of power to the capacitors under test, and closure of its contacts $a$ and $b$, $d$ and $e$, and $g$ and $h$ discharges the respective capacitors under test to ground. This condition of the circuitry is also illustrated in FIG. 5.

In FIG. 6 the condition of the circuitry is indicated under the circumstances that one of the capacitors under test has excessive leakage current such that the relay CR2 has not been re-energized. Since its contacts $a$ and $b$ are, therefore, not closed, the circuit to the indicating lamp 35 and to the relay CR6 is not closed.

After a predetermined period of time, a timer 40 operates to close its contacts $a$ and $b$ such that power is applied through the conductor 31 and these contacts to both the indicator lamp 35 and the relay CR6. This terminates the test, including the discharging of the capacitors, but contacts $d$ and $e$ of the timer 40 also close to cause illumination of another indicator lamp 45 which is preferably red in color. Illumination of the lamp 45 indicates that one or more of the capacitors under test has excessive leakage current.

When the test has been completed the circuitry may be restored to its normal condition by removal of power from the control circuitry. Following insertion of three new capacitors in the test apparatus for testing, closure of the power switch energizes CR4 to bring the circuitry again to the condition illustrated in FIG. 2.

It may now be seen that testing apparatus constructed in accordance with the present invention indicates whether current flowing to one or more capacitors under test is greater or smaller than a prescribed maximum leakage current. The apparatus also serves to provide a continuing indication as to whether or not effective electrical contact has been made between the testing apparatus and the capacitor or capacitors under test. This eliminates the possibility of accepting capacitors which have not in fact been tested. The apparatus also serves to interrupt the testing operation as soon as the currents to all the capacitors under test drop below the prescribed maximum value of leakage current.

Still further, in the event that one or more of the capacitors under test proves to have excessive leakage current, the apparatus provides for interruption of the testing operation following a prescribed period of time, and provides an indication that the capacitors did not test satisfactorily.

Since closure of the contacts $a$ and $b$ of the relay CR5 supplies power to the red light 30 and to the relay CR7, which applies power to the capacitors under test, there is a momentary energization of the light 30, lasting until the relay CR8 is actuated. Thus there is an indication in each testing cycle the lamp 30 is operative.

While only one embodiment of the invention has been disclosed, many modifications will be apparent, and it is intended that the invention be interpreted as including all modifications which fall within the true spirit and scope of the invention.

What is claimed is:
1. Apparatus for testing capacitors comprising:
   a voltage source for applying a D.C. voltage to a capacitor under test;
   translating means, including a voltage comparison circuit, responsive to current flow through a capacitor under test, said translating means attaining a first operable condition when the capacitor current is in excess of a prescribed value, and attaining a second operable condition when the capacitor current is less than the prescribed value;
   first indicator means, responsive to a change in condition of said translating means, for indicating the attainment of said first operable condition by said translating means;
   means for retaining the indication of said first indicator means in response to said translating means again attaining its second operable condition; and
   second indicator means, responsive to a change in condition of said translating means, for indicating the attainment of said second operable condition by said translating means.

2. Apparatus for testing capacitors in accordance with claim 1, wherein there are provided means, responsive to the attainment of said second operable condition by said translating means, for interrupting the application of D.C. voltage to the capacitor under test.

3. Apparatus for testing a plurality of capacitors simultaneously comprising:
   a voltage source for applying a D.C. voltage to the capacitors under test;
   a plurality of translating means, each including a voltage comparison circuit, and each being responsive to current flow through a different capacitor under test, each translating means attaining a first operable condition when the capacitor current associated therewith is in excess of a prescribed value, and attaining a second operable condition when the capacitor current associated therewith is less than the prescribed value;
   first indicator means, responsive to a change in condition of all of said translating means, for indicating the attainment of said first operable condition by all of said translating means;
   means for retaining the indication of said first indicator means in response to any of said translating means again attaining its second operable condition; and
   second indicator means, responsive to a change in condition of all of said translating means, for indicating the attainment of said second operable condition by all of said translating means.

4. Apparatus for testing capacitors in accordance with claim 3, wherein there are provided means, responsive to the attainment of said second operable condition by all of said translating means, for interrupting the application of D.C. voltage to the capacitors under test.

5. Apparatus for testing capacitors comprising:
   a voltage source for applying a D.C. voltage to a capacitor under test;
   translating relay means, including a voltage comparison circuit, responsive to current flow through the capacitor to operate two sets of contacts, said contacts attaining a first operable condition when the capacitor current is in excess of a prescribed value, and attaining a second operable condition when the capacitor current is less than the prescribed value;
   first indicator means connected to one set of contacts for indicating current flow to the capacitor of a value in excess of the prescribed value in response to said two sets of contacts attaining said first operable condition;
   circuit means for retaining the indication of said first indicator means in response to said two sets of contacts again attaining said second operable condition; and second indicator means connected to the other set of contacts for indicating current flow to the capacitor of a value less than the prescribed value in response to said two sets of contacts attaining said second operable condition.

6. Apparatus for testing a plurality of capacitors simultaneously comprising:

a voltage source for applying a D.C. voltage to the capacitors under test;

a plurality of voltage comparison circuits each associated with a different capacitor under test, and each selectively establishing first and second operable states in response to current flow through the associated capacitor, said first operable state being established in response to capacitor current of a value in excess of a prescribed value, and the second operable state being established in response to capacitor current of a value less than the prescribed value;

a plurality of relays, each being responsive to a different comparison circuit, for operating first and second sets of contacts, said first and second sets of contacts attaining a first operable condition in response to said associated comparison circuit establishing said first operable state, and attaining a second operable condition in response to said associated comparison circuit establishing said second operable state;

first indicator means connected to said first sets of contacts, and responsive to said first and second sets of contacts attaining said first operable condition, for indicating current flow to all of said capacitors of a value in excess of the prescribed value;

circuit means for retaining the indication of said indicator means in response to said first and second sets of contacts of any of said relays again attaining said second operable condition; and second indicator means connected to said second sets of contacts for indicating current flow to all of the capacitors of respective values less than the prescribed value in response to said first and second sets of contacts attaining said second operable condition.

7. Apparatus for testing a plurality of capacitors simultaneously comprising:

a plurality of voltage comparison circuits each associated with a different capacitor under test, and each selectively establishing first and second operable states in response to current flow through the associated capacitor, said first operable state being established in response to capacitor current of a value in excess of a prescribed value, and the second operable state being established in response to capacitor current of a value less than the prescribed value;

a plurality of relays, each connected to a different comparison circuit, for operating first and second sets of contacts, said first and second sets of contacts attaining a first operable condition wherein said first set of contacts is closed and said second set of contacts is opened in response to said associated comparison circuit establishing said first operable state, and said first and second sets of contacts attaining a second operable condition wherein said first set of contacts is opened and said second set of contacts is closed in response to said associated comparison circuit establishing said second operable state;

first indicator means for indicating concurrent charging currents in excess of the prescribed value to each of the capacitors, said indicating means being connected to be operated by concurrent closure of said first set of contacts of each of said relays;

circuit means for maintaining operation of said indicating means in response to and following the opening of said first set of contacts of any of said relays; and second indicator means for indicating concurrent leakage currents of values less than the prescribed value to each of the capacitors, said second indicator means being connected to be operated by concurrent closure of said second set of contacts of each of said relays.

References Cited by the Examiner
UNITED STATES PATENTS 3,041,522   6/1962   Beck et al. _____ 320—48 X

References Cited by the Applicant
UNITED STATES PATENTS 1,823,492   9/1931   Houck.

WALTER L. CARLSON, *Primary Examiner.*

E. E. KUBASIEWICZ, *Assistant Examiner.*